United States Patent
Nagata

(10) Patent No.: US 8,656,804 B2
(45) Date of Patent: Feb. 25, 2014

(54) STEERING WHEEL AND STEERING APPARATUS

(75) Inventor: Kenshi Nagata, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/258,421

(22) PCT Filed: Feb. 17, 2010

(86) PCT No.: PCT/JP2010/052328
§ 371 (c)(1),
(2), (4) Date: Sep. 21, 2011

(87) PCT Pub. No.: WO2010/113551
PCT Pub. Date: Oct. 7, 2010

(65) Prior Publication Data
US 2012/0006148 A1 Jan. 12, 2012

(30) Foreign Application Priority Data
Apr. 2, 2009 (JP) .................. 2009-090295

(51) Int. Cl.
*B62D 1/06* (2006.01)
*B60R 16/02* (2006.01)
*B62D 1/04* (2006.01)

(52) U.S. Cl.
CPC ............. *B60R 16/0215* (2013.01); *B62D 1/046* (2013.01); *B62D 1/06* (2013.01)
USPC ........................................................ 74/558

(58) Field of Classification Search
USPC .................. 74/558, 552, 558.5; 29/894.1
See application file for complete search history.

(56) References Cited

U.S. PATENT DOCUMENTS

| | | | |
|---|---|---|---|
| 6,668,682 B1 * | 12/2003 | Emeneth et al. ................ | 74/552 |
| 2002/0017157 A1 * | 2/2002 | Kreuzer et al. ................. | 74/552 |
| 2003/0121360 A1 * | 7/2003 | Hussy ............................. | 74/558 |
| 2006/0230874 A1 * | 10/2006 | Buiocchi ........................ | 74/552 |

(Continued)

FOREIGN PATENT DOCUMENTS

| | | |
|---|---|---|
| JP | 5-069063 | 5/1984 |
| JP | 2001-055149 | 2/2001 |

(Continued)

OTHER PUBLICATIONS

International Search Report in PCT/JP2010/052328 dated Apr. 6, 2010.

*Primary Examiner* — Alan B Waits
*Assistant Examiner* — Brian McGovern
(74) *Attorney, Agent, or Firm* — Foley & Lardner LLP

(57) ABSTRACT

The disclosure discloses a steering wheel for steering a vehicle, comprising: a steering wheel metal core that forms a wheel frame; and a covering portion that covers an area surrounding the steering wheel metal core; the steering wheel metal core having: a boss portion that connects the steering wheel metal core and a steering shaft; an annular portion; and a spoke portion that connects the boss portion and the annular portion; and the covering portion having: an annular covering portion that covers the annular portion of the steering wheel metal core; a harness housing groove portion that is configured to house an electric harness for an electrical structure arranged in the covering portion and is formed into a groove shape on a surface facing to an occupant of the annular covering portion; and a harness cover, that covers the electric harness housed in the harness housing groove portion.

6 Claims, 5 Drawing Sheets

(56) References Cited

U.S. PATENT DOCUMENTS

2006/0236807 A1* 10/2006 Yasuda et al. .................. 74/552
2007/0137413 A1*  6/2007 Xu et al. ........................ 74/552
2010/0218641 A1*  9/2010 Neumann et al. .............. 74/552
2010/0251849 A1* 10/2010 Kurata et al. .................. 74/552
2011/0245643 A1* 10/2011 Lisseman et al. ............. 600/372

FOREIGN PATENT DOCUMENTS

| JP | 2001-114112 | 4/2001 | |
| JP | 2007-153048 | 6/2007 | |
| WO | WO 2009/030223 A2 * | 3/2009 | B62D 1/04 |

* cited by examiner

STEERING WHEEL AND STEERING APPARATUS

BACKGROUND OF THE INVENTION

1. Field of the Invention

The present invention relates to construction technology for a steering wheel for vehicle steering that is mounted to a vehicle.

2. Description of the Related Art

In prior art, JP, A, 2001-55149, for example, discloses a steering wheel for vehicle steering that comprises, in particular, a configuration wherein an electrical structure (display) is arranged on the driver's side. According to the steering wheel described in JP, A, 2001-55149, a display is mounted on the driver's side of the steering wheel, and an electric harness for supplying electricity to the electrical structure is wired to the display via a guide tube that is laid within a covering layer.

There is a desire for a design of a steering wheel in which an electric harness for an electrical structure is simply wired on the steering wheel without using other members such as the guide tube described in JP, A, 2001-55149.

SUMMARY OF THE INVENTION

The present invention was designed in light of the above, and it is therefore an object of the present invention to provide effective technology for simplifying a harness wiring structure configured to wire on a steering wheel for vehicle steering that is mounted to a vehicle an electric harness for supplying electricity to an electrical structure mounted to the steering wheel.

Means for Solving the Problems

The present invention is configured to resolve the above problems. Note that the present invention can be applied to vehicles in general, and is applicable to the construction technology of a steering wheel for vehicle steering that is mounted to a moving body, in general, such as an automobile, bus, taxi, ship, or train.

The steering wheel according to the present invention is a steering wheel for steering a vehicle, and comprises at least a steering wheel metal core and a covering portion.

The steering wheel metal core comprises a metal core section made of metal that forms a wheel frame of the steering wheel. That is, this steering wheel metal core is a member that constitutes a frame section that is provided to a section that serves as the core of the steering wheel via a metal material, and maintains the strength of the steering wheel itself. This steering wheel metal core has at least a boss portion, annular portion, and spoke portion. The boss portion constitutes the area of the steering wheel metal core that connects the steering wheel metal core and steering shaft. The annular portion constitutes the area of the steering wheel metal core that is annularly configured, and is typically annular in shape. Note that, depending on the shape of the steering wheel, this annular portion can comprise an elliptical or polygon shape as well. The spoke portion constitutes the area of the steering wheel metal core that connects the boss portion and annular portion.

The covering portion serves as the area that covers the area surrounding the steering wheel metal core, and includes an annular covering portion, a harness housing groove portion, and a harness cover. The annular covering portion constitutes the area that covers the annular portion of the steering wheel metal core. This annular covering portion is typically formed by an industrial resin, such as polypropylene (PP) resin, acrylonitrile-butadiene-styrene (ABS) resin, or urethane resin. The harness housing groove portion constitutes a groove portion formed into a groove shape on the surface facing to an occupant of the annular covering portion for housing the electric harness of the electrical structure that is arranged in the covering portion. The surface facing to the occupant of the annular covering portion is a surface that faces the occupant when the steering wheel is mounted to the vehicle, and is provided in the area of the annular covering portion that is opposite the annular portion of the steering wheel metal core. Note that the electrical structure may be arranged in the covering portion or the annular covering portion of the covering portion, or in an area other than the annular covering portion. The harness cover constitutes a harness cover section that covers the electric harness housed in the harness housing groove portion. In the present invention, the electrical structure and electric harness may serve as components integrated with the steering wheel or as components separate from the steering wheel.

According to the above configuration of the steering wheel according to the present invention, the harness housing groove portion is provided directly to the annular covering portion itself, eliminating the necessity to provide a new member for wiring the electric harness, thereby simplifying the harness wiring structure. At this time, the annular covering portion serves two functions: the function of covering the annular portion of the steering wheel metal core and the function of routing the electric harness for supplying electricity to the electrical structure, achieving a rational design. Further, the harness housing groove portion is provided to the annular covering portion during molding, making it possible to simply form a harness housing groove portion that is compatible with the harness shape and size.

Further, according to another embodiment of the steering wheel according to the present invention, the harness housing groove portion preferably comprises a configuration that includes an arc-shaped groove portion that extends in an arc shape along the annular portion of the steering wheel metal core between the area corresponding to the electrical structure (referred to as the "first area") and the area corresponding to the spoke portion (referred to as the "second area"). This harness housing groove portion may have at least a groove portion that extends between the first area and the second area, and may constitute a harness housing groove portion by the groove portion only, or with an additional groove portion that extends along a path that differs from that of the groove portion. According to such a configuration, the electric harness introduced from the second area corresponding to the spoke portion can extend in an arc shape toward the first area corresponding to the electrical structure, along the annular portion of the steering wheel metal core.

Further, according to the steering wheel of yet another embodiment according to the present invention, the arc-shaped groove portion preferably comprises a configuration divided into a first groove portion that extends clockwise in an arc shape along the annular portion from the area corresponding to the spoke portion, and a second groove portion that extends counterclockwise in an arc shape along the annular portion from the area corresponding to the spoke portion. According to such a configuration, a plurality of electric harnesses introduced from the second area corresponding to the spoke portion is branched into a first groove portion side and a second groove portion side, making it possible to extend each of the branched electric harnesses to the first area corresponding to the electrical structure via each groove portion. At this time, the electric harness that extends to the first groove portion and the electric harness that extends to the second groove portion may be configured to connect to a single (the identical) electrical structure or to different electrical structures.

Further, according to yet another embodiment of the steering wheel according to the present invention, the harness cover preferably comprises a configuration that includes a cover surface portion and a pair of extending portions. The cover surface portion constitutes an area having a shape that is in accordance with the outer surface of the annular covering portion. The pair of extending portions is established in parallel from the back side of the cover surface portion and constitutes an area established in the space corresponding to the groove width of the harness housing groove portion. Then, when this harness cover is mounted, the pair of extending portions extends to the harness housing groove portion, and the end portion of the cover surface portion comes in contact with an opening edge portion of the harness housing groove portion. According to such a configuration, a harness cover is provided that effectively and simply covers the electric harness housed in the harness housing groove portion.

Further, according to yet another configuration of the steering wheel according to the present invention, at least one of the harness cover and the annular covering portion preferably comprises an interfering portion that interferes with the electric harness housed in the harness housing groove portion. At this time, the electric harness housed in the harness housing portion is preferably held and clamped from both sides and positioned in a preset fixed location by a plurality of interfering portions. According to such a configuration, the electric harness housed in the harness housing groove portion is reliably arranged (positioned) in a preset fixed location by the interfering portions, and interferes with the interfering portions, thereby effectively preventing the occurrence of abnormal noise produced by shifts in the electric harness. Accordingly, the harness wiring structure can be simplified and the harness can be reliably arranged in the harness housing groove portion.

The steering apparatus according to the present invention comprises a steering wheel for steering a vehicle, and an airbag module that is arranged inside the outer shape of the steering wheel and is configured to restrain a vehicle occupant via an airbag than deploys and inflates in an occupant restraining region in the event of a vehicular collision. Particularly, the steering wheel of this steering apparatus is configured using the steering wheel of any one of the above-described embodiments. As a result, according to the present invention, a steering apparatus is provided that comprises a steering wheel featuring a simplified harness wiring structure of an electric harness for supplying electricity to an electrical structure.

Advantages of the Invention

As described above, according to the present invention, it is possible to simplify the harness wiring structure of a steering wheel for steering a vehicle by, in particular, utilizing a structure that provides a harness housing groove portion that routes an electric harness for supplying electricity to an electrical structure to an annular covering portion that covers an annular portion of a steering wheel metal core.

DETAILED DESCRIPTION OF THE PREFERRED EMBODIMENTS

The following describes the structure of a steering apparatus 100, which is an embodiment of the "steering apparatus" according to the present invention, with reference to attached drawings. The overall configuration of this steering apparatus 100 will now be described with reference to FIG. 1 and FIG. 2. Here, FIG. 1 shows a plan view of the steering apparatus 100 of the embodiment, and FIG. 2 shows a plan view of the state in which harness covers 123 and 124 of a steering wheel 101 in FIG. 1 are removed.

Figure 1:
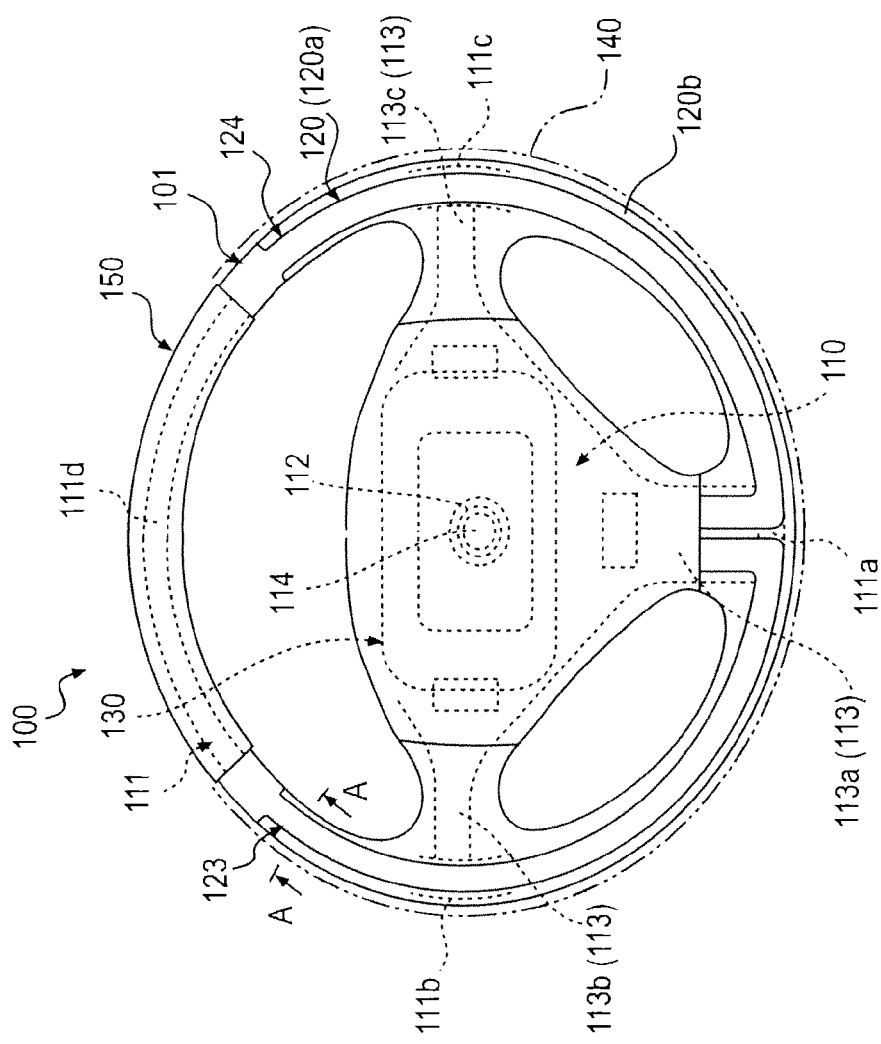
FIG. 1 is a plan view of a steering apparatus of an embodiment.
Figure 2:
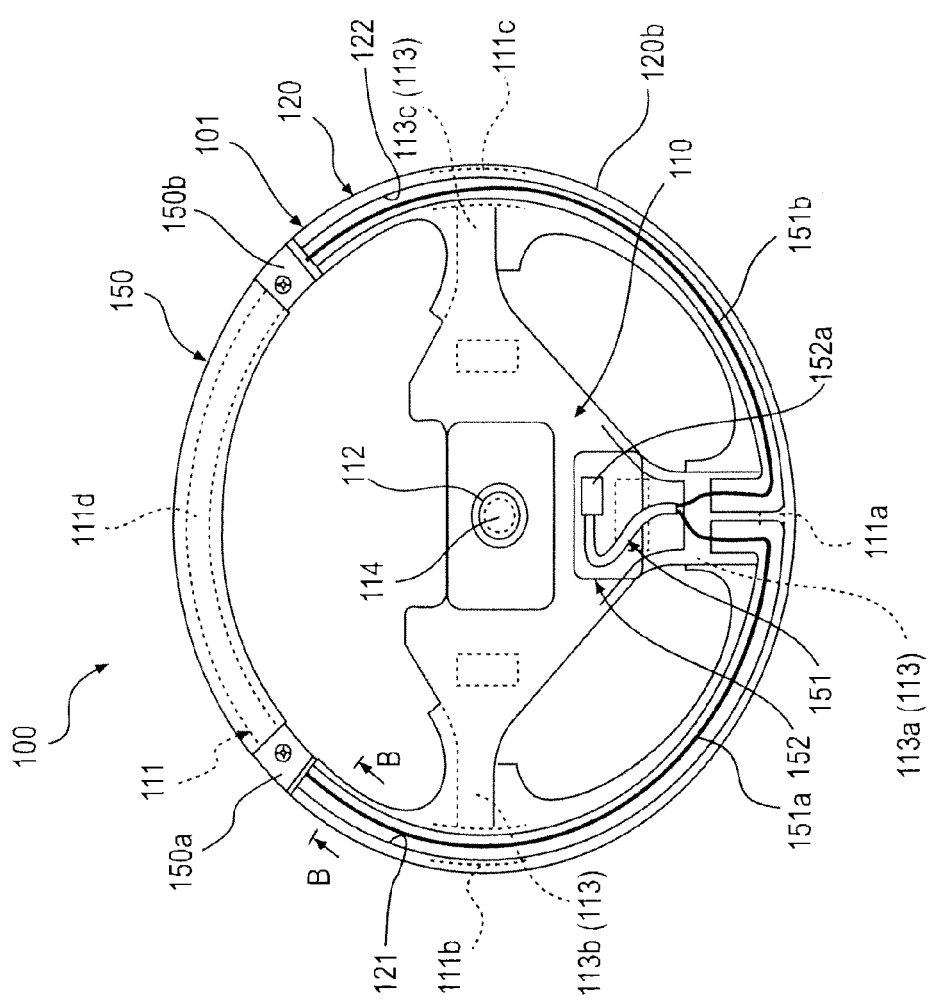
FIG. 2 is a plan view of a state in which the harness cover of the steering wheel of FIG. 1 is removed.

As shown in FIG. 1, the steering apparatus 100 comprises the steering wheel 101 for vehicle steering that is used by a driver to steer a vehicle. The components of the steering wheel 101 are broadly divided into a steering wheel metal core 110 and a covering portion 120. Additionally, an airbag module 130 wherein an airbag folded into a predetermined form deploys and inflates by gas supply is mounted within the outer shape of the steering wheel 101 of this steering apparatus 100. This airbag module 130 fulfills the function of restraining a vehicle occupant via the airbag that deploys and inflates in an occupant restraining region in the event of a vehicular collision. The steering wheel 101 and the airbag module 130 described here are equivalent to the "steering wheel" and "airbag module" of the present invention.

The steering wheel metal core 110 is a metal core section made of metal that forms a wheel frame of the steering wheel 101. This steering wheel metal core 110 is provided to the section that serves as the core of the steering wheel 101, and constitutes a frame section that maintains the strength of the steering wheel 101 itself The steering wheel metal core 110 comprises at least an annular portion 111 formed into an elliptical shape, a boss portion 112, and a spoke portion 113, and typically is made of one or a plurality of shell members. The steering wheel metal core 110 here is equivalent to the "steering wheel metal core" of the present invention.

The annular portion 111 constitutes an area formed into an annular shape that follows the wheel outer shape of the steering wheel metal core 110. The boss portion 112 constitutes the area connected to the steering shaft 114 (schematically shown in FIGS. 1 and 2) serving as the vehicle steering shaft in the central region of the steering wheel metal core 110. The spoke portion 113 constitutes the area that connects the annular portion 111 and the boss portion 112. FIG. 1 illustrates a case where there is a total of three spoke portions, including a central spoke portion 113a that connects a vehicle rear region 111a of the annular portion 111 and the boss portion 112, a left spoke portion 113b that connects a left region 111b of the annular portion 111 and the boss portion 112, and a right spoke portion 113c that connects a right region 111c of the annular portion 111 and the boss portion 112. The annular portion 111, the boss portion 112, and the spoke portion 113 here are equivalent to the "annular portion," "boss portion," and "spoke portion" of the present invention, respectively.

Note that the extended flat surface of the steering wheel 101 inclines toward the vehicle front when the steering apparatus 100 is mounted to the vehicle. With this arrangement, in the normal steering position, the area corresponding to "12:00" of the steering wheel 101 serves as the vehicle front region, and the area corresponding to "6:00" of the steering wheel 101 serves as the vehicle rear region. As a result, according to this description, in the normal steering position (steering position for proceeding straight forward) with the steering apparatus 100 mounted to the vehicle, the area positioned farthest toward the vehicle rear, i.e., the lower side of the steering apparatus 100 in FIG. 1 and FIG. 2, is referred to as the "vehicle rear region," and the area positioned farthest toward the vehicle front, i.e., the upper side of the steering apparatus 100 in FIG. 1 and FIG. 2, is referred to as the "vehicle front region."

The covering portion 120 of the steering wheel 101 constitutes a covering portion made of a resin material that covers the steering wheel metal core 110. This covering portion 120 comprises at least an annular covering portion 120a, a harness housing groove portion (harness housing groove portion comprising first and second groove portions 121 and 122 described later), and a harness cover (a harness cover comprising first and second harness covers 123 and 124 described later). Further, a steering wheel skin 140 made of real leather, synthetic leather, a metal sheet, woven fabric, textile, a resin sheet, or a rubber sheet is suitably joined to the surface of the covering portion 120 and decorated. The covering portion 120 here is equivalent to the "covering portion" of the present invention.

The annular covering portion 120a constitutes a covering portion that covers the annular portion 111 of the steering wheel metal core 110. This annular covering portion 120a is typically formed by an industrial resin, such as polypropylene (PP) resin, acrylonitrile-butadiene-styrene (ABS) resin, or urethane resin. The annular covering portion 120a here is equivalent to the "annular covering portion" of the present invention.

According to this embodiment, an electrical structure 150 is mounted to the occupant side (a surface 120b facing to an occupant of the annular covering portion 120a) of the steering wheel 101. The member preferably used for this electrical structure 150 is a display member capable of displaying information via an electric power supply, a light-emitting member capable of light emission via an electrical power supply, or a switch member capable of switch operations via an electrical power supply. This electrical structure 150 is installed and fixed in particular to the spoke portion 113 in a vehicle front region 111d of the surface 120b of the annular covering portion 120a. Further, according to this embodiment, an electric harness 151 is provided in order to supply electricity to the electrical structure 150.

As shown in FIG. 2, the electric harness 151 constitutes a harness member that extends lengthwise between the electrical structure 150 and a power supply relay portion 152 connected to the battery side. Specifically, the electric harness 151 comprises a left harness 151a and a right harness 151b that are each routed on the steering wheel 101 toward the vehicle front region 111d via the vehicle rear region 111a of the annular portion 111 of the spoke region 113, extending from a connector 152a of the power supply relay portion 152.

On the other hand, the harness housing groove portion constitutes an arc-shaped groove portion that forms a groove shape on the surface 120b of the annular covering portion 120a that is to house the electric harness 151 for the electrical structure 150, and extends in an arc shape along the annular portion 111 of the steering wheel metal core 110 between the area corresponding to the electrical structure 150 and the area corresponding to the spoke region 113. With this arrangement, the electric harness 151 introduced from the area corresponding to the central spoke region 113a is capable of extending in an arc shape toward the area corresponding to the electrical structure 150 along the annular region 111 of the steering wheel metal core 110.

This harness housing groove portion is divided into the first groove portion 121 and the second groove portion 122. The first groove portion 121 constitutes a harness housing groove portion that is formed clockwise in an arc shape along the left section of the annular portion 111 of the steering wheel metal core 110 on the surface 120b of the annular covering portion 120a from the area corresponding to the central spoke portion 113a, and houses the left harness 151a of the electric harness 151. The second groove portion 122 constitutes a harness housing groove portion that is formed counterclockwise in an arc shape along the right section of the annular portion 111 of the steering wheel metal core 110 on the surface 120b of the annular covering portion 120a from the area corresponding to the central spoke portion 113a, and houses the right harness 151b of the electric harness 151. With this arrangement, the two harnesses 151a and 151b introduced from the area corresponding to the central spoke region 113a are branched to the first groove portion 121 side and the second groove portion 122 side, making it possible to respectively extend the branched harnesses 151a and 151b toward the area corresponding to the electrical structure 150 via each groove portion.

Then, the left harness 151a that extends toward the electrical structure 150 through the first groove portion 121 in a clockwise direction in FIG. 2 is connected to a left connector 150a on the left side of the electrical structure 150. Further, the right harness 151b that extends toward the electrical structure 150 through the second groove portion 122 in a counterclockwise direction in FIG. 2 is connected to a right connector 150b on the right side of the electrical structure 150. In this manner, according to this embodiment, the left harness 151a and the right harness 151b are both connected to the single (identical) electrical structure 150. The first groove portion 121 here is equivalent to the "first groove portion" of the present invention, and the second groove portion 122 is equivalent to the "second groove portion" of the present invention. Further, the harness housing groove portion made of the first groove portion 121 and the second groove portion 122 constitutes the "harness housing groove portion" of the present invention.

Note that, according to this embodiment, the power supply relay portion 152 may constitute a control portion that supplies electricity to the electrical structure 150 from the battery power supply and include a control circuit for controlling the electrical structure 150 as well. Or, the power supply relay portion 152 may constitute an area that simply distributes electricity from the battery power supply to the electrical structure 150.

Figure 3:
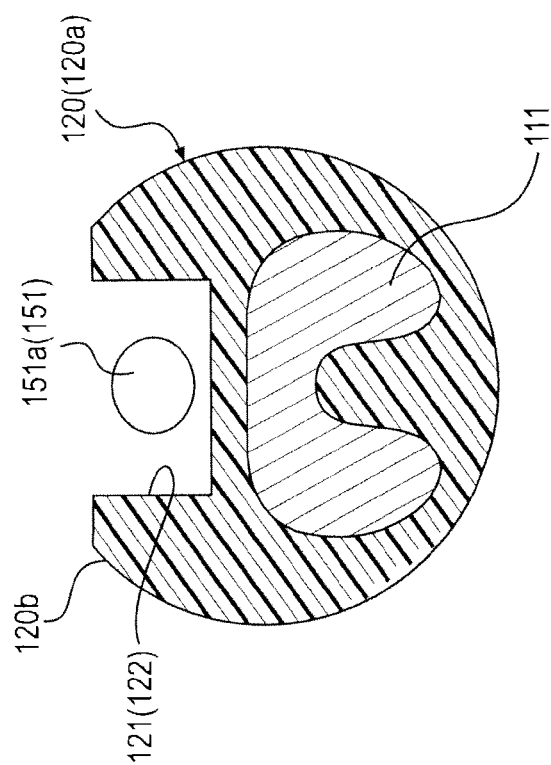
FIG. 3 is a diagram illustrating the cross-sectional structure along line B-B of the steering wheel of FIG. 2, with the harness cover not mounted.
Figure 4:
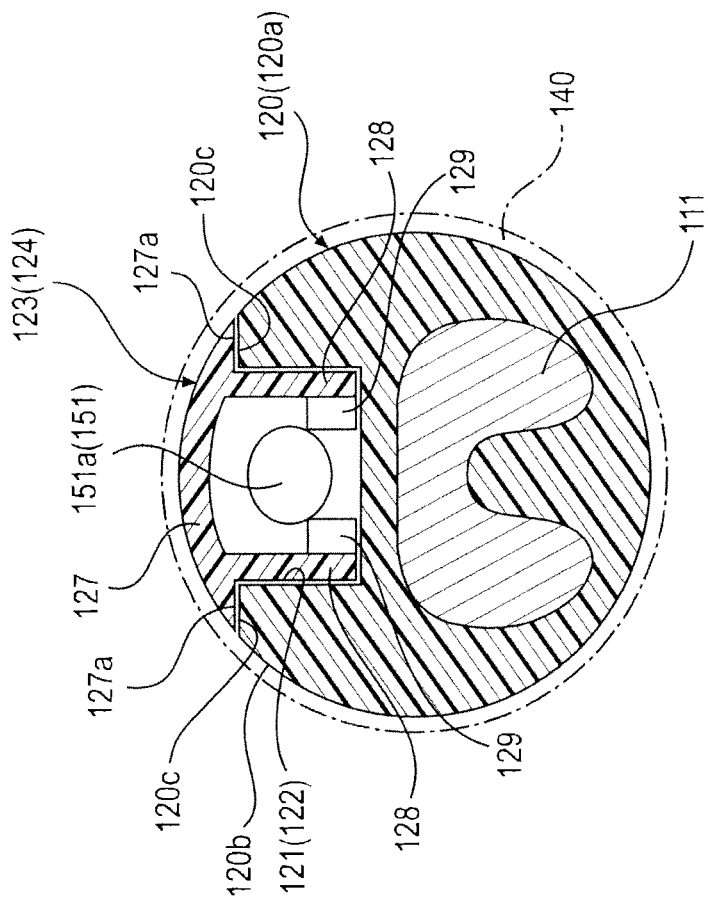
FIG. 4 is a diagram illustrating the cross-sectional structure along line A-A of the steering wheel of FIG. 1, with the harness cover mounted.
Figure 5:
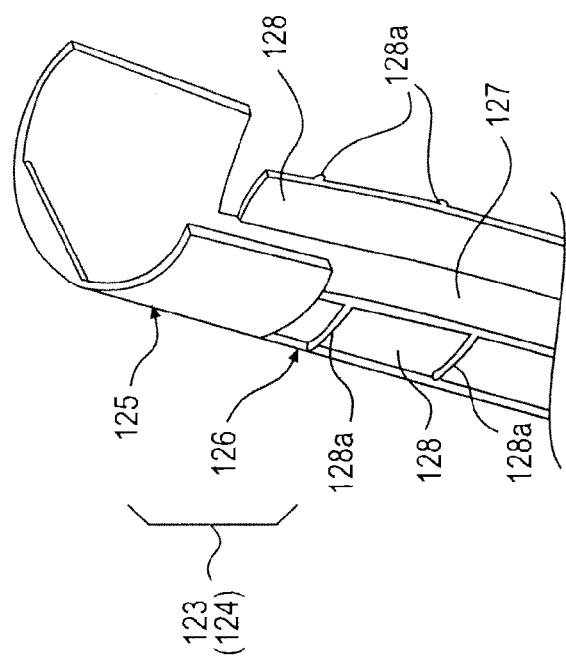
FIG. 5 is a partial perspective view of the harness cover mounted to the annular covering portion in FIG. 2.

With regard to the housing structure of the electric harness 151 of the harness housing groove portion of the annular covering portion 120a, refer to FIG. 3 to FIG. 5. Note that the first groove portion 121 and the second groove portion 122 share the same configuration, and that the description that follows describes the first groove portion 121 as an example. FIG. 3 shows the cross-sectional structure along line B-B of the steering wheel 101 in FIG. 2 with the harness covers not mounted, and FIG. 4 shows the cross-sectional structure along line A-A of the steering wheel 101 in FIG. 1 with the harness covers mounted. Further, FIG. 5 shows a partial perspective view of the harness covers 123 and 124 mounted to the annular covering portion 120a in FIG. 2.

As shown in FIG. 3, the first groove portion 121 that houses the left harness 151a of the electric harness 151 constitutes an indented groove portion that is concave in shape, indenting toward the inside of the surface 120b in the cross-sectional structure of the annular covering portion 120a. This first groove portion 121 has a groove width and a groove depth that are larger than the cross-sectional diameter of the left harness 151a. According to such a configuration, the harness housing groove portion is provided directly to the annular covering portion 120a itself, eliminating the need to provide a new member for harness wiring, thereby simplifying the harness wiring structure. At this time, the annular covering portion 120a serves two functions: the function of covering the annular portion 111 of the steering wheel metal core 110 and the function of routing the electric harness 151 for supplying electricity to the electrical structure 150, thereby achieving a rational design. Further, the harness housing groove portion is provided to the annular covering portion 120a during molding, making it possible to simply form a harness housing groove portion that is compatible with the shape and size of the electric harness 151.

Further, as shown in FIG. 4 and FIG. 5, the steering wheel 101 of this embodiment is provided with the harness covers 123 and 124 for the harness housing groove portion (the first groove portion 121 and the second groove portion 122). These harness covers 123 and 124 fulfill the function of securing the design by covering the electric harness 151 (the left harness 151a and the right harness 151b) housed in the harness housing groove portion, and covering the harness housing groove portion so as to embed the groove portion that has a cross-sectional indented shape. These harness covers 123 and 124, similar to the annular covering portion 120a, can be formed by an industrial resin, such as polypropylene (PP) resin, acrylonitrile-butadiene-styrene (ABS) resin, or urethane resin, or a rubber material.

The first harness cover 123 is mounted to the area corresponding to the first groove portion 121 on the surface 120b of the annular covering portion 120a, and the second harness cover 124 is mounted to the area corresponding to the second groove portion 122 of the surface 120b of the annular covering portion 120a. The surface 120b of the annular covering portion 120a is a surface that faces the occupant when the steering wheel is mounted to the vehicle, and is provided in an area opposite the annular portion 111 of the steering wheel metal core 110 of the annular covering portion 120a as well. Each of the harness covers 123 and 124 comprises a first cover portion 125 that covers the external surface of the connectors 150a and 150b of the electrical structure 150, and a second cover portion 126 that covers and fills the groove portions 121 and 122 of the annular covering portion 120a. The first harness cover 123 and the second harness cover 124 here are equivalent to the "harness cover" of the present invention.

The second cover portion 126 of each of the harness covers further comprises a cover surface portion 127 having a shape that follows the external surface (surface 120b facing to an occupant) of the annular covering portion 120a, and a pair of extending portions 128 and 128 that extend in an intersecting manner from the rear side of the cover surface portion 127 toward the cover surface portion 127. The cover surface portion 127 here is equivalent to the "cover surface portion" of the present invention, and the pair of extending portions 128 and 128 here is equivalent to the "pair of extending portions" of the present invention. As shown in FIG. 5, a plurality of protruding ribs 128a that extend in the extending direction of the extending portions is provided to the outer surface of each of the extending portions 128, fulfilling the function of serving as reinforcement ribs for the extending portions. The space between the pair of extending portions 128 and 128 corresponds to the groove width of each groove portion of the harness housing groove portion, and is typically set so that the outer surface of each extending portion is in close contact with the groove portion wall surface when the pair of extending portions 128 and 128 is inserted into each of the grooves of the harness housing groove portion.

With such a configuration, when the harness cover on which each harness cover is provided is mounted, the connectors 150a and 150b of the electrical structure 150 are covered by the first cover portion 125, and the first groove portion 121 and the second groove portion 122 of the harness housing groove portion are filled by the second cover portion 126. According to the second cover portion 126, both end portions 127a and 127a of the cover surface portion 127 come in contact with an opening edge portion 120c of each groove portion, and movement in the groove width direction is regulated by the pair of extending portions 128 and 128 inserted into each groove portion of the harness housing groove portion. At this time, the pair of extending portions 128 and 128 preferably comes in close contact with the groove portion wall surface by its elastic force in the diameter expansion direction that separates the two, causing each harness cover to attach to the harness housing groove portion in an immovable state. Thus, according to this embodiment, harness covers 123 and 124 that effectively cover the electric harness 151 housed in the first groove portion 121 and the second groove portion 122 of the harness housing groove portion in a simple manner are provided. Both end portions 127a and 127a of the cover surface portion 127 here are equivalent to the "end portions of the cover surface portion" of the present invention, and the opening edge portion 120c here is equivalent to the "opening edge portion of the harness housing groove portion" of the present invention. Further, the area corresponding to the extending portion 128 of each harness cover may be omitted as necessary, allowing adoption of a configuration wherein the area corresponding to the cover surface portion 127 is directly installed to the area corresponding to the annular covering portion 120a, or another installation structure.

Further, according to this embodiment, one or a plurality of interfering portions 129 capable of interfering with the harnesses 151a and 151b housed in each of the groove portions 121 and 122 of the annular covering portion 120a is provided. The interfering portion 129 here is equivalent to the "interfering portion" of the present invention. FIG. 4 shows a first configuration wherein the interfering portion 129 is provided to the area facing the harnesses 151a and 151b of the harness covers 123 and 124. According to this first configuration, the electric harness 151 housed in the groove portions 121 and 122 of the annular covering portion 120a is preferably positioned in a preset fixed location held and clamped from both sides by the plurality of interfering portions 129. Other possible configurations that can be suitably used include a second configuration wherein the interfering portion 129 is provided to the area facing the harnesses 151a and 151b of the annular covering portion 120a, a third configuration wherein the interfering portion 129 is provided to another member arranged on the groove portions 121 and 122 separate from the harness covers 123 and 124 and the annular covering portion 120a, and a fourth configuration wherein at least two of the first to third configurations are combined.

According to the interfering portion 129 of such a configuration, it is possible to reliably arrange (position) the electric harness 151 (the left harness 151a and the right harness 151b)

housed in the groove portions 121 and 122 of the annular covering portion 120a to a preset fixed location by the interfering portion 129. Additionally, the interfering portion 129 effectively prevents the production of noise caused by a shift in the electric harness 151, and further increases the reliability of the fixed arrangement of the harness in the harness housing groove portion.

Note that the electrical structure 150, the electric harness 151, and the power supply relay portion 152 are preferably configured as an assembly that is preassembled into an integrated form. According to such a configuration, the assembly is mounted to the steering wheel 101, improving the efficiency of assembly work.

Other Embodiments

The present invention is not limited to the above-described embodiment only, and various applications and modifications are possible. For example, each of the following embodiments, which apply the above-described embodiment, may also be implemented.

While the above embodiment describes an illustrative scenario in which the harness housing groove portion (first groove portion 121 and second groove portion 122) extends in an arc shape along the annular portion 111 of the steering wheel metal core 110, the present invention is not limited to the arc shape of the extended portion of the harness housing groove portion, allowing use of a configuration in which the harness housing groove portion extends into a shape other than an arc shape, such as a curved shape or linear shape. Further, while the embodiment describes an illustrative scenario in which the harness housing groove portion is divided into two groove portions, the first groove portion 121 and the second groove portion 122, the present invention allows configuration of a harness housing groove portion having a single groove portion or three or more groove portions.

Further, while the above embodiment describes an illustrative scenario in which both the left harness 151a and the right harness 151b are connected to the single electrical structure 150, the present invention allows use of a configuration wherein a plurality of harness is connected to different electrical structures.

Further, while the above embodiment describes a case wherein the electrical structure 150 is arranged on the annular covering portion 120a of the covering portion 120, the present invention allows arrangement of the electrical structure 150 in an area other than the annular covering portion 120a of the covering portion 120, such as the area corresponding to the spoke portion 113.

Further, while the above embodiment describes the configuration of a steering apparatus of an automobile, the present invention is applicable to a configuration of a steering apparatus for moving body, in general, such as a vehicle other than an automobile, including a bus, taxi, ship, or train.

What is claimed is:

1. A steering wheel for steering a vehicle, comprising:
   a steering wheel metal core made of metal that forms a wheel frame of said steering wheel; and
   a covering portion that covers an area surrounding said steering wheel metal core;
   said steering wheel metal core having:
     a boss portion that connects said steering wheel metal core and a steering shaft;
     an annular portion configured into an annular shape; and
     a spoke portion that connects said boss portion and said annular portion; and
   said covering portion having:
     an annular covering portion that covers said annular portion of said steering wheel metal core;
     a harness housing groove portion that is configured to house an electric harness for an electrical structure arranged in said covering portion and is formed into a groove shape on a surface of said annular covering portion, the surface of the annular covering portion facing a driver of the vehicle when the steering wheel is mounted in the vehicle; and
     a harness cover that covers said electric harness housed in said harness housing groove portion,
   wherein said harness cover has a plurality of interfering portions that interfere with said electric harness housed in said harness housing groove portion such that the electric harness is held by the plurality of interfering portions at a fixed location at a non-zero distance from a bottom of the harness housing groove portion.

2. A steering apparatus comprising:
   the steering wheel according to claim 1; and
   an airbag module that is arranged within an outer shape of said steering wheel and is configured to restrain the driver by an airbag that deploys and inflates in an occupant restraining region in an event of a vehicular collision.

3. The steering wheel according to claim 1, wherein the harness housing groove portion extends from the spoke portion along the annular portion of the steering wheel metal core.

4. The steering wheel according to claim 1, wherein said harness housing groove portion further comprises an arc-shaped groove portion that extends in an arc shape along said annular portion of said steering wheel metal core between an area corresponding to said electrical structure and an area corresponding to said spoke portion.

5. The steering wheel according to claim 4, wherein said arc-shaped groove portion is divided into a first groove portion that extends clockwise in an arc shape along said annular portion from the area corresponding to said spoke portion, and a second groove portion that extends counterclockwise in an arc shape along said annular portion from the area corresponding to said spoke portion.

6. The steering wheel according to claim 1, wherein said harness cover has:
   a cover surface portion having a front side with a shape that follows an outer surface of said annular covering portion, said covering surface portion having a rear side with an end portion; and
   a pair of extending portions that extend perpendicularly from the end portion of said cover surface portion and are arranged in a space corresponding to a groove width of said harness housing groove portion,
   wherein said pair of extending portions are inserted into said harness housing groove portion and the end portion of said cover surface portion comes in contact with an opening edge portion of said harness housing groove portion when said harness cover is mounted.

* * * * *